United States Patent [19]

Stockman

[11] Patent Number: 5,001,597
[45] Date of Patent: Mar. 19, 1991

[54] CAPACITOR WITH MOUNTING CORE

[75] Inventor: Robert M. Stockman, Palm Coast, Fla.

[73] Assignee: American Radionic Co., Inc., Palm Coast, Fla.

[21] Appl. No.: 411,048

[22] Filed: Sep. 22, 1989

[51] Int. Cl.⁵ .......................... H01G 1/14; H01G 7/00
[52] U.S. Cl. ..................................... 361/306; 29/25.42
[58] Field of Search ............... 29/25.42; 361/301, 306, 361/400, 403, 417, 513; 24/3 A, 16 PB, 17 AP

[56] References Cited

U.S. PATENT DOCUMENTS

| | | | |
|---|---|---|---|
| 1,385,379 | 7/1921 | Kratz | 29/25.42 X |
| 2,166,139 | 7/1939 | Guthrie et al. | 29/25.42 X |
| 2,242,780 | 5/1941 | Georgiev | 361/513 |
| 2,894,316 | 7/1959 | Genovese | 29/25.42 |
| 3,971,105 | 7/1976 | Caveney | 24/16 PB |
| 4,028,595 | 6/1977 | Stockman | 29/25.42 X |
| 4,719,539 | 1/1988 | Lavene | 29/25.42 X |

FOREIGN PATENT DOCUMENTS

| | | | |
|---|---|---|---|
| 63151 | 2/1945 | Denmark | 361/306 |
| 2624334 | 12/1977 | Fed. Rep. of Germany | 29/25.42 |
| 2484691 | 12/1981 | France | 29/25.42 |
| 2154062 | 8/1985 | United Kingdom | 361/513 |

*Primary Examiner*—Donald A. Griffin
*Attorney, Agent, or Firm*—Parmelee, Bollinger & Bramblett

[57] ABSTRACT

The specification teaches a method for producing a wound capacitor section wherein the core of the winding is employed as an integral mechanical mount for the completed capacitor, and also the capacitor produced thereby. In one embodiment, the core is longer than the capacitor section and the excess core is threaded for use in mounting the capacitor. In another embodiment, a flexible tie strap is threaded through the hollow core and encapsulated therein.

8 Claims, 2 Drawing Sheets

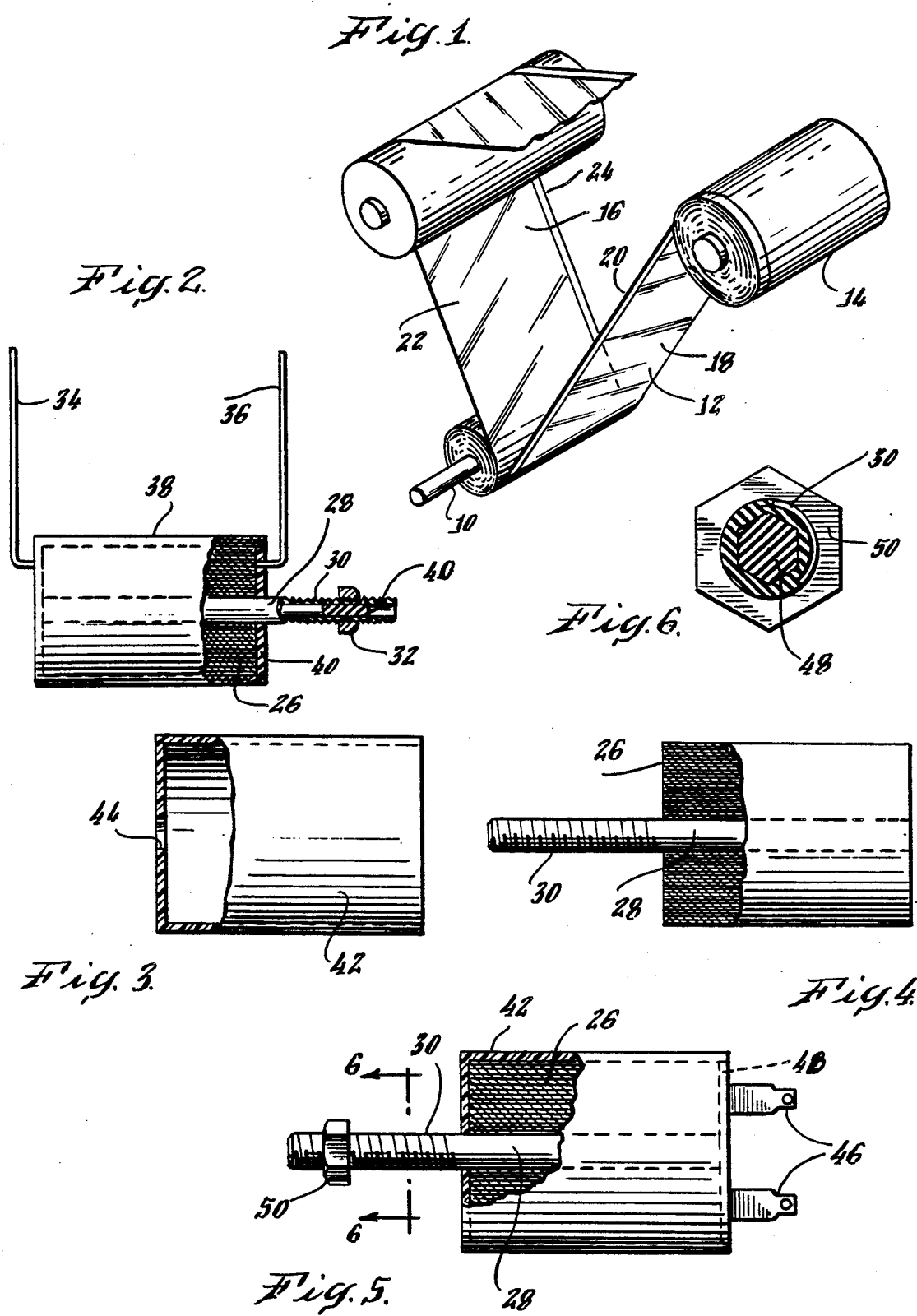

CAPACITOR WITH MOUNTING CORE

TECHNICAL FIELD

This invention relates to electrical capacitors and, more particularly, to capacitors of the type having a cylindrical capacitor section which is wound upon a central core.

BACKGROUND ART

It is well known to manufacture capacitors by winding alternating layers of conductors and dielectrics onto a rotating core positioned in a winding machine. The dielectrics and conductors may be separate elements such as, for example, paper and foil strips. Alternatively, a pair of dielectric films may be employed, each of which carries on one surface a metallized layer which serves as a conductive plate of the capacitor. Examples of metallized film capacitors may be found in the following of my U.S. Pat. Nos. RE29,126; 3,921,041; 4,028,595; 4,263,638; 4,352,145; 4,312,027; and 4,558,394.

The capacitor section is normally wound upon a core which is a small cylindrical tube having a smooth outer surface and a center of hexagonal cross section which receives the rotating mandrel of the winding machine. A typical core might be, for example, three inches in length. If the capacitor section to be wound is shorter than the length of the core, it is customary to wind it upon the full size core. After winding, the excess core is simply cut off and discarded prior to completing the capacitor by applying electrical leads and encapsulating.

Small size capacitors can be mounted in a circuit with the electrical leads also serving as the mechanical support. However, larger capacitors normally require some type of external mounting means such as clamps--especially when used in devices subject to shock or vibration. This forces original equipment manufacturers to improvise a number of clamping arrangements and to keep on hand the extra hardware required to serve as clamps or other mechanical support. It would be desirable if the capacitor itself carried integral mounting means to thereby avoid the extra complexity.

Accordingly, it is a primary object of the present invention, to provide method and apparatus for supplying a capacitor wherein the mounting element is the capacitor core itself. Other objects, features and advantages will become apparent from the following description and appended claims.

DISCLOSURE OF INVENTION

The invention comprises: a method for manufacturing a wound capacitor having mounting means integral with the capacitor core; and the capacitor so formed.

A substantially cylindrical core is provided which has a smooth surface along a portion of its length at least as long as a capacitor section to be wound. A capacitor section in the form of alternate layers of conductor and dielectric are wound upon the smooth surface of the core. Mounting means are provided which are integral with the core for use in mounting the completed capacitor.

BRIEF DESCRIPTION OF THE DRAWINGS

The embodiments of the invention are to be described by way of example with reference to the drawings wherein:

FIG. 1 is a perspective view illustrating a capacitor section being wound upon a core;

FIG. 2 is an elevational view, in partial cross section, of a capacitor constructed in accordance with this invention;

FIG. 3 is an elevational view, in partial cross section, of a housing for a capacitor constructed in accordance with this invention;

FIG. 4 is an elevational view, in partial cross section, of a capacitor section and core manufactured in accordance with the invention;

FIG. 5 is an elevational view, in partial cross section, of a completed capacitor formed from the elements shown in FIGS. 3 and 4;

FIG. 6 is an enlarged cross section taken substantially along the line 6—6 of FIG. 5;

BEST MODE FOR CARRYING OUT THE INVENTION

Figure 8:
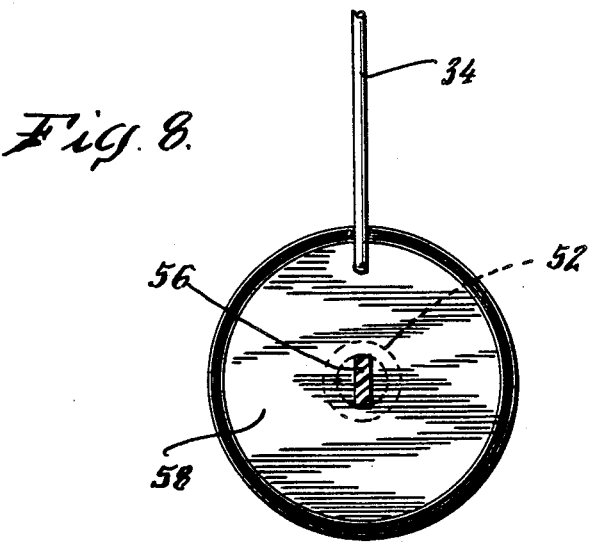
FIG. 8 is a cross section taken substantially along the line 8—8 of FIG. 7.

There is illustrated in FIG. 1 a capacitor section being wound in a conventional winding machine upon a rotating core 10. The core 10 has a smooth exterior surface and a hollow interior of hexagonal cross section for receiving the mandrel (not shown) of the winding machine.

A metallized dielectric film 12 is fed from a first supply roll 14 and a second metallized dielectric film 16 is fed from a second supply roll (not shown). Film 12 carries on its near surface, as viewed in FIG. 1, a thin metallic layer 18 which extends to the right edge of the film but terminates short of the left edge, leaving a strip 20 of non-metallized dielectric therealong. The film 16 similarly carries a thin metal layer 22 on its near surface as viewed in FIG. 1 which extends to the left edge of the film but terminates short of the right edge to leave a strip 24 of non-metallized dielectric therealong. This is a conventional winding technique.

After the section is wound, the excess core, which may be made of a plastic such as nylon, is normally cut off and discarded. The ends of the capacitor section are metal-sprayed and electrical leads are attached. The capacitor is then completed by wrapping and filling or by encapsulating it within a housing.

In one embodiment of the present invention, the excess core is retained but is then threaded. This allows the completed capacitor to be mechanically mounted by means of one or more nuts or by being threaded into a tapped hole in a circuit board, chassis, or other mechanical structure. FIG. 2 for example, illustrates a capacitor section 26 wound upon a core 28, the extending end of which has been threaded to provide a threaded stud 30 upon which a nut 32 is mounted. After applying electrical leads 34, 36, the capacitor section is wrapped as with paper or plastic 38. Wrapping 38 extends slightly beyond the ends of the capacitor section 26 and these areas are then filled with an encapsulant 40. In the capacitor illustrated in FIG. 2, encapsulant 40 also fills the interior of the core 28. This, however, is not a necessary feature of the invention.

FIGS. 3–6 illustrate a variation comprising a similar capacitor section 26 wound upon a core 28, the end of which has been threaded to provide the threaded stud 30. In this embodiment a cup-shaped dielectric housing 42 is provided which has a hole 44 in its closed end. The capacitor section 26 is placed within the housing with the threaded stud 30 extending through hole 44. Electrical contacts 46 are applied conventionally and the end enclosed with an encapsulant 48.

The completed capacitor is shown in FIG. 5 carrying nut 50 and with the interior of the stud 30 filled with the encapsulant 48. However, as explained above, this is not a necessary feature of the invention. It is to be understood that the core 28 may be threaded either before or after winding the capacitor section 26. It will also be apparent that it is not even necessary to thread the extending core. It could, for example, be engaged by a friction-lock, or other type of mechanism. The important feature is that the core of the capacitor section becomes an integral part of the capacitor's mechanical mount.

Figure 7:
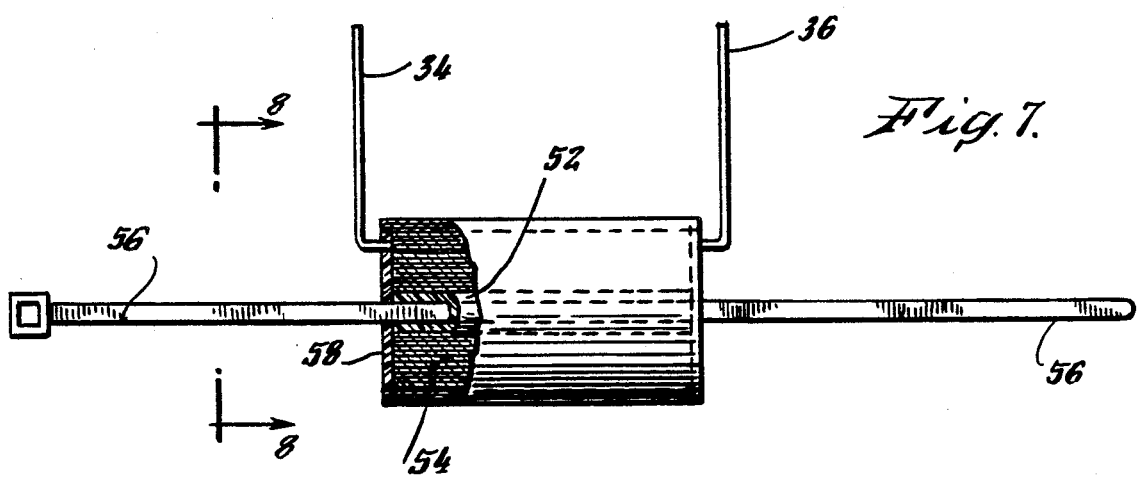
FIG. 7 is an elevational view, in partial cross section, of a variation of the capacitor of this invention.

FIGS. 7 and 8 illustrate a still further modification of this invention. In this modification, core 52 of the capacitor section 54, is cut off flush with the end of the section 54. However, a plastic wire tie 56, or similar element, is passed through the hollow core 52 prior to filling the ends with the encapsulant 58. The encapsulant 58 fills the hollow interior of the core 52, locking the wire tie 56 in place. After completion, the capacitor may be mounted by interlocking the opposed ends of the wire tie 56 around any suitable retaining structure.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. The method of manufacturing a wound capacitor section having integral capacitor mounting means which comprises:
   providing a substantially cylindrical hollow core having first and second ends and a smooth surface along a portion of its length at least as long as a capacitor section to be wound;
   winding a capacitor section comprising alternate layers of conductor and dielectric upon said smooth surface in conventional manner; and
   securing within said core a mounting strap having at least one end extending outwardly from at least the first end of said core for mounting the completed capacitor.

2. The method of claim 1 wherein said mounting strap includes a second end extending outwardly from the second end of said core.

3. The method of manufacturing a wound capacitor having integral capacitor mounting means which comprises:
   providing a substantially cylindrical hollow core having first and second ends and a smooth surface along a portion of its length at least as long as a capacitor section to be wound;
   winding a capacitor section comprising alternate layers of conductor and dielectric upon said smooth surface in conventional manner;
   securing within said core a mounting strap having at least one end extending outwardly from at least the first end of said core for mounting the completed capacitor;
   securing electrical leads to the conductor layers; and
   enclosing said capacitor section within a housing, the leads and mounting member extending therefrom.

4. The method of claim 3 wherein said mounting strap includes a second end extending outwardly from the second end of said core.

5. A wound capacitor section having integral capacitor mounting means which comprises:
   a substantially cylindrical core having first and second ends and a smooth surface along at least a portion of its length;
   alternate layers of conductor and dielectric wound upon said smooth surface to form a cylindrical capacitor section; and
   a mounting strap having a first end extending outwardly from at least the first end of said core for mounting a completed capacitor.

6. The capacitor section of claim 5 wherein said mounting strap includes a second end extending outwardly from the second end of said core.

7. A wound capacitor having integral mounting means which comprises:
   a substantially cylindrical core having first and second ends and a smooth surface along at least a portion of its length;
   alternate layers of conductor and dielectric wound upon said smooth surface to form a cylindrical capacitor section;
   electrical leads connected to said conductor layers;
   a mounting strap having a first end extending outwardly from at least the first end of said core; and
   housing means enclosing said capacitor section while exposing said electrical leads and mounting member.

8. The capacitor section of claim 7 wherein said mounting strap includes a second end extending outwardly from the second end of said core.

* * * * *